US008326500B2

(12) United States Patent
Mariman et al.

(10) Patent No.: US 8,326,500 B2
(45) Date of Patent: Dec. 4, 2012

(54) ROW UNIT WHEEL TURNING MONITOR FOR AN AGRICULTURAL MACHINE

(75) Inventors: Nathan A Mariman, Geneseo, IL (US); Paul R. Riewerts, Port Byron, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/619,859

(22) Filed: Nov. 17, 2009

(65) Prior Publication Data

US 2011/0113996 A1 May 19, 2011

(51) Int. Cl.

*G06F 7/70* (2006.01)
*G06F 19/00* (2006.01)
*G06G 7/00* (2006.01)
*G06G 7/76* (2006.01)

(52) U.S. Cl. ........................... 701/50; 111/200; 111/903

(58) Field of Classification Search ........ 172/2; 701/50; 345/418; 111/52, 200, 900, 903

See application file for complete search history.

(56) References Cited

U.S. PATENT DOCUMENTS

| | | | | |
|---|---|---|---|---|
| 3,622,977 | A * | 11/1971 | Wakamatsu et al. | 340/453 |
| 5,936,234 | A * | 8/1999 | Thomas et al. | 250/222.2 |
| 2004/0206282 | A1* | 10/2004 | Sandoval et al. | 111/52 |
| 2008/0255737 | A1* | 10/2008 | Fujiwara et al. | 701/51 |
| 2008/0278583 | A1* | 11/2008 | Evenson, II | 348/164 |
| 2009/0315881 | A1* | 12/2009 | Matsumoto et al. | 345/418 |

FOREIGN PATENT DOCUMENTS

| | | |
|---|---|---|
| EP | 0281761 | 9/1988 |
| EP | 0476266 | 3/1992 |

OTHER PUBLICATIONS

European Search Report (7 pages).

* cited by examiner

*Primary Examiner* — Christopher J. Novosad

(57) ABSTRACT

A row unit of a planter or other agricultural machine having ground engaging wheels is equipped with a rotation sensor to determine if and when a wheel stops rotating. An alert is issued by a monitor to the operator so that corrective action can be taken. Further, further the monitor also determines when the machine is in use depositing an input versus turning at the end of the rows so that the rotation sensors to not generate an alert when the machine is not in use delivering an input to the field.

8 Claims, 2 Drawing Sheets

10
12
14
16
16
18
20
22
24
26
28
28
28
30
32
34
34
36
36
36
38
38
40
40
50
52
54
56
58
60
62
64

14
72
74
74
72
70

ROW UNIT WHEEL TURNING MONITOR FOR AN AGRICULTURAL MACHINE

FIELD OF THE INVENTION

The present invention relates to an agricultural machines having row units with ground engaging wheels and in particular to such a machine having one or more sensors to detect when a ground engaging wheel of a row unit stops rotating.

BACKGROUND OF THE INVENTION

Over time, debris can come to the surface of an agricultural field such as decaying fence posts, bricks, concrete, stones, war debris, etc. These items have a tendency to get caught in row unit gauge wheels and other ground engaging wheels. When this occurs, the wheels stop turning, causing the row unit to plow the soil. The input that is being put in the soil is then displaced from its intended depth and location. In the case of seed, this results in poor emergence. For fertilizer the plants may not receive the intended nutrient level. For herbicides, they may not provide the protection intended. As machines such as planters, air seeders, etc. are getting wider, it is more difficult for the operator to see all of the row units behind the machine to ensure proper rotation of the wheels.

SUMMARY OF THE INVENTION

The present invention provides an agricultural machine such as a planter with one or more sensors that detect when a ground engaging wheel of a row unit is no longer turning. The sensor is coupled to a monitor that provides an alert to the operator in the event a wheel stops turning. The invention can further be used on various agricultural machines that apply inputs such as a planter, air seeder, grain drill, fertilizer applicator or chemical applicator that has row units with ground engaging wheels where failure of a wheel to rotate can interfere with the placement of the input.

DESCRIPTION OF THE PREFERRED EMBODIMENT

Figure 1:
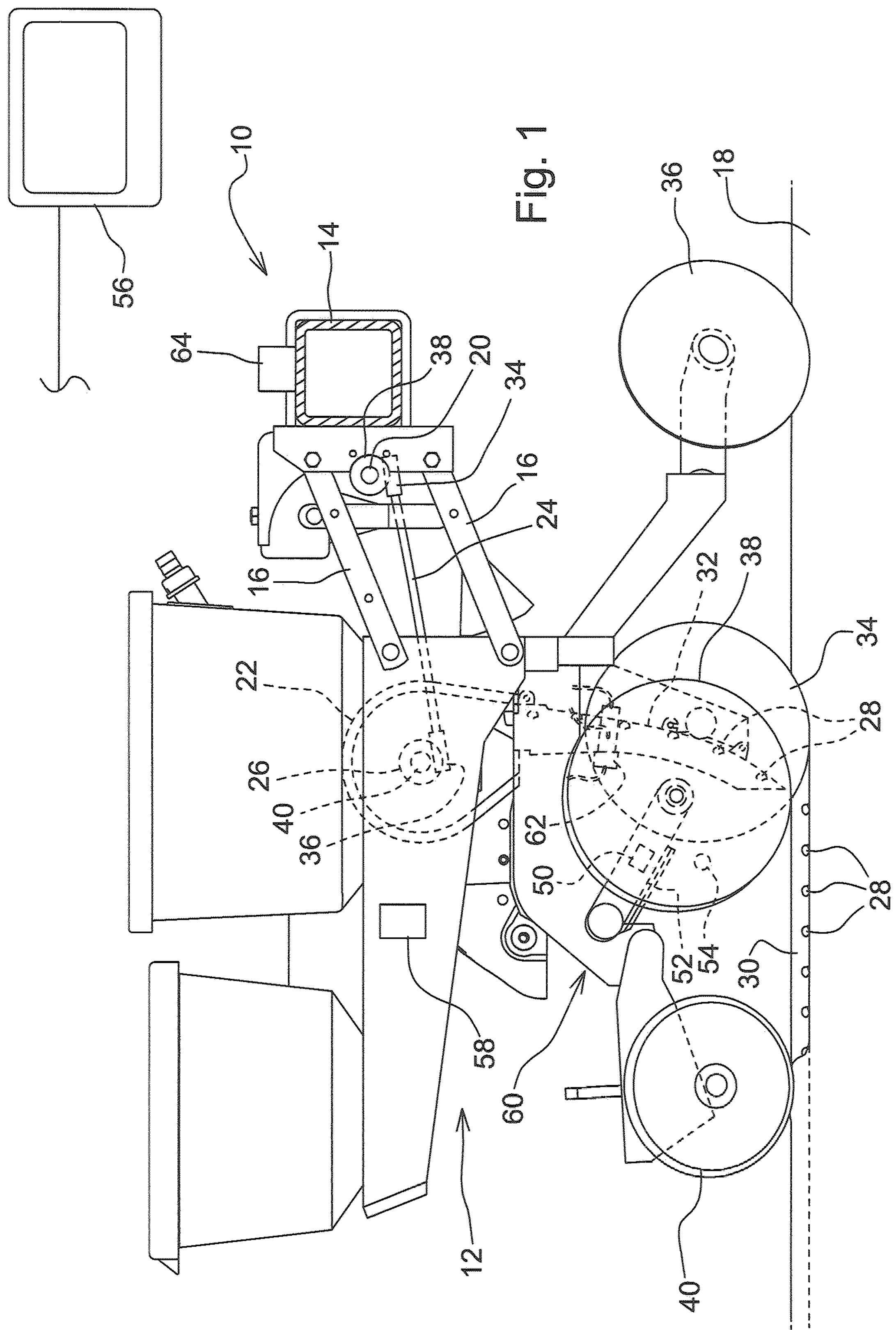
FIG. 1 is a side view of a planter row unit according to the present invention.

The invention is now describe with reference to FIG. 1 where a row unit of a row crop planter is shown. It is understood that this is an example of but one implementation of the invention, the invention being applicable to any machine depositing inputs that has row units with ground engaging wheels. Referring now FIG. 1, there is shown a row unit 12 of a seeding machine 10. Seeding machine 10 includes a plurality of individual row units 12 coupled with a transverse tool bar or frame 14. Each row unit 12 is typically configured substantially identical to each other, and therefore, only a single row unit 12 is shown and described.

Row unit 12 is coupled with frame 14 through pivotal linkage elements 16, and thereby is movable in generally vertical up and down directions to follow the contour of soil 18. A planter drive includes a ground driven main shaft 20 that runs along the backside of frame 14 and is the source, or a primary source, of input power to each seed meter 22. A flexible drive shaft 24 couples the main shaft 20 to a transmission 26. The output of the transmission is a meter shaft of the seed meter 22. Seed meter 22 is used to space seeds 28 at an average predetermined distance from each other within seed trench 30. Seeds from the seed meter are deposited in the trench through seed tube 32.

The seed trench 30 is formed by a double disk opener 34. A coulter 36 forward of the opener assists in cutting through trash and crop debris from the previous growing season. Gauge wheels 38 located to the sides and slightly rearward of the opening disks, determine the depth to which the opener disks penetrate the soil, and thus the depth of the seed trench 30. Rearward of the gauge wheels are closing disks or wheels 40 that close the trench by placing soil on top of the seed. The row unit may be equipped with a packer wheel (not shown) behind the closing wheels to compact the soil in the seed trench. Such packer wheels are well known. Each of the coulter 36, gauge wheels 38, closing wheels 40 and packer wheels are mounted to rotate about respective axes at their centers. For convenience hereafter, the coulter, gauge wheels, closing wheels or disks and packer wheel will be referred to as "ground engaging wheels" of the row unit.

The row unit can have coulters, opener disks, gauge wheels, closing wheels, packer wheels and a input depositing means in various combinations. The present invention is application to all such machines and all are included in the term "agricultural machine" or "planting machine" as used herein.

The ground engaging wheels of the row unit may, from time to time, catch debris in the field, such as crop stubble, wood, rocks, bricks, war debris, etc. that can stop rotation of the ground engaging wheel. When this happens, the wheel will "plow" the soil. The seed that is planted or other input will be displace from its intended planting depth and location, resulting in poor emergence, reduced effectiveness, etc. With a large machine, it is impossible for the operator to be able to see all the row units and to visually verify that none of the ground engaging wheels have stopped rotating. Thus, in accordance with this invention, a wheel rotation sensor is provided for the ground engaging wheels of the row unit. As an example, with reference to FIG. 1, a magnetic sensor 50 is mounted to the gauge wheel support arm 52. A magnet 54 is mounted to the gauge wheel and is sensed by the sensor 50 as it passes thereby to determine rotation of the gauge wheel. The output signal of the sensor 50 is communicated to a monitor 56 located on the operator's station of a tractor (not shown) in a conventional manner. In the event the gauge wheel stops rotating, and the magnet 54 no longer passes the sensor 50, the monitor will alert the operator to that fact to enable corrective action to be taken. A similar sensor and magnet arrangement can be applied to the coulter 36, closing wheel 40 or a packer wheel (not shown).

Other types of rotation sensors can be used as well. The invention is not limited to any particular sensor type. Other sensor types include inductive sensors, proximity sensors, optical sensors, all of which are capable of use in sensing wheel rotation. An optical sensor may be mounted remotely relative to the sensed wheeled. For example, an optical sensor 58 may be mounted on the row unit frame 60. The sensor 58 may detect rotation of the wheels of that row unit or may be equipped with visibility to the wheels on the adjacent row unit. The optical sensor may also be mounted to the tool bar 14 between row units. The optical sensor may require indicia on the rotating wheel to detect rotation. A speed sensor integrated into the bearings of the ground engaging wheels may also be used to sense rotation. Sensors similar to those used in automotive anti-lock brake systems can be used here. If the speed is zero, or a speed different than the sensors on other row units, an alert is issued to the operator.

To be most useful, the rotation sensors must only work when the planting machine is in use applying an input. When the unit is lifted, for example to make a turn at the end of a row, the row unit ground engaging wheels will no longer rotate, but there is no need to alert the operator. The output signal of a seed sensor 62 can be used to control the rotation sensors. Only when the seed sensor is detecting passing seed is the machine in use planting. If there is no seed being detected, the rotation sensors can be turned off or not monitored. Other ways of detecting operation of the machines are described below.

Figure 2:
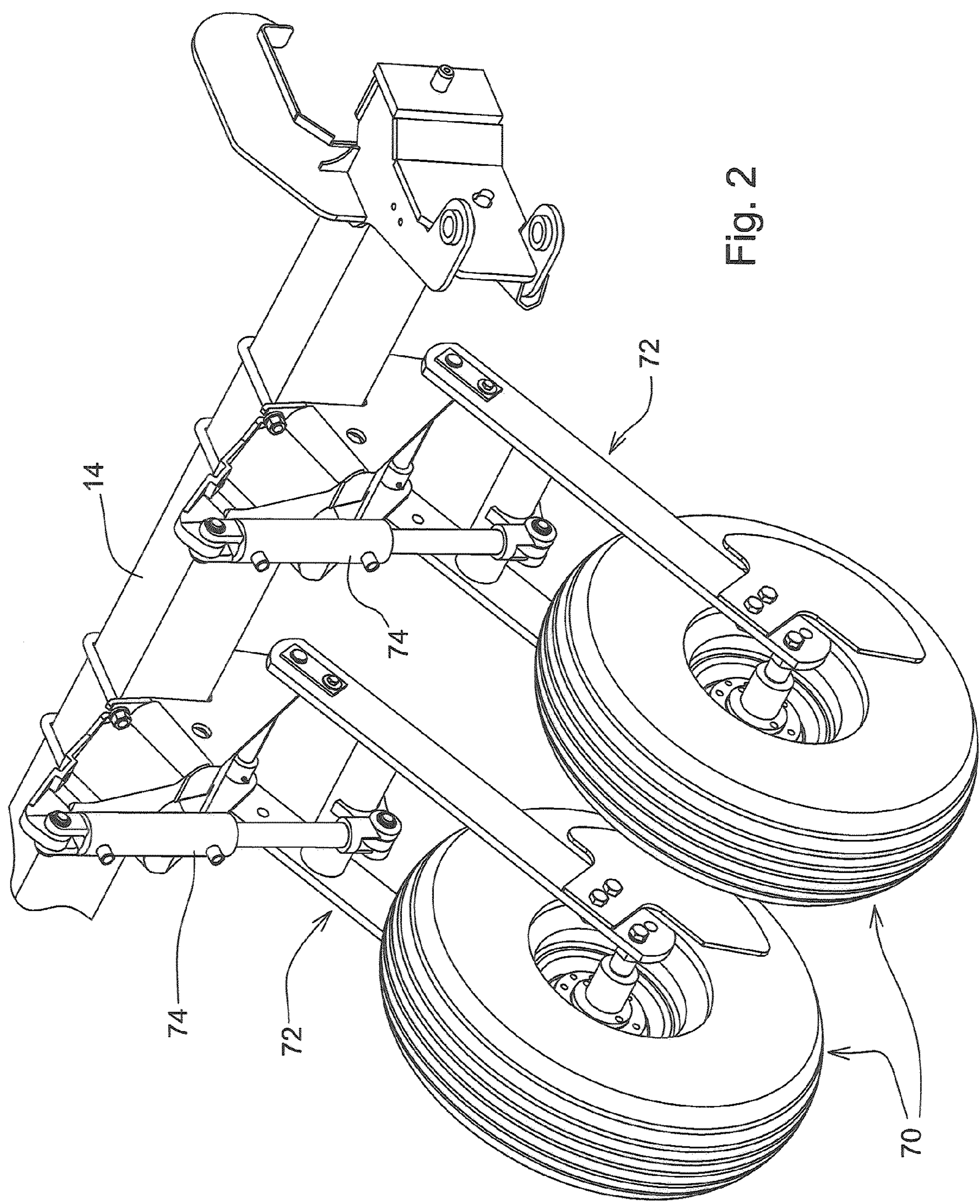
FIG. 2 is a perspective view of a portion of the machine frame illustrating a set of support wheels.

FIG. 2 shows portion of the frame 14 and one set of supporting wheel and tire assemblies 70. The wheel and tire assemblies are attached to the frame via linkages 72 that permit the frame to be raised and lowered relative to the wheel and tire assemblies to raise and lower the ground engaging tools and wheels of the row units. Hydraulic cylinders 74 control the position of the linkages 72. Such a lifting structure is well known for agricultural machines. The rotation sensors may be turned off when the tool bar 14 is raised to lift the row units from the ground. An input from the control circuit used to operate the cylinders 74 and control the tool bar position can be used to provide a tool bar position signal to the monitor. When the tool bar is raised, the rotation sensors are turned off or not monitored.

Information concerning the position of the tool bar can be further combined with machine speed information to only activate the rotation sensors when the machine is both lowered and in motion. The speed can be determined from the tractor transmission control system when a forward travel speed is requested. Alternatively, a speed sensor 64 can be mounted to the planting machine to sense forward travel speed, or the speed can be determined from changes in the machine location over time as determined by a global positioning system.

One additional way to determine if the row unit is in use applying a product is the status of row unit drive clutches. Many planters are equipped with clutches in the drive train between the drive shaft 20 and the seed meter. One example of such a clutch is shown in U.S. Pat. No. 7,571,688 and incorporated herein by reference. The clutch is controlled electrically and the electronic control signal can be used to determine when the rotation sensors should be activated or monitored.

By providing a sensor to detect rotation of the ground engaging wheels of a machine row unit, the monitor can provide an alert to the machine operator. This is particularly helpful with machines that are too wide for the operator to see each row unit to determine if the wheels are rotating as intended.

Having described the preferred embodiment, it will become apparent that various modifications can be made without departing from the scope of the invention as defined in the accompanying claims.

The invention claimed is:

1. A row unit of an agricultural machine for dispensing a product as the machine moves over a field, the row unit comprising:

a furrow opener, an input dispenser, a plurality of ground engaging wheels, a sensor to detect rotation of more than one ground engaging wheel, and means to activate an alarm to alert an operator when the sensor detects that one of the ground engaging wheels is not rotating while said agricultural machine is in motion.

2. The row unit of claim 1 where the ground engaging wheel is a depth control gauge wheel.

3. The row unit of claim 1 where the ground engaging wheel is a closing wheel.

4. The row unit of claim 1 one of the ground engaging wheels is a packer wheel.

5. The row unit of claim 1 further comprising means to determine when the row unit is in operation applying an input to the ground.

6. The row unit of an agricultural machine of claim 1 wherein the plurality of ground engaging includes at least two of a gauge wheel, a closing wheel, a packer wheel, and a coulter wheel.

7. The row unit of an agricultural machine of claim 1 further comprising means for deactivating the means to alert an operator when the row unit is not in operation applying an input to the ground.

8. The row unit of an agricultural machine of claim 7 wherein the means for deactivating includes a seed sensor to detect the passing of seed.

* * * * *